UNITED STATES PATENT OFFICE.

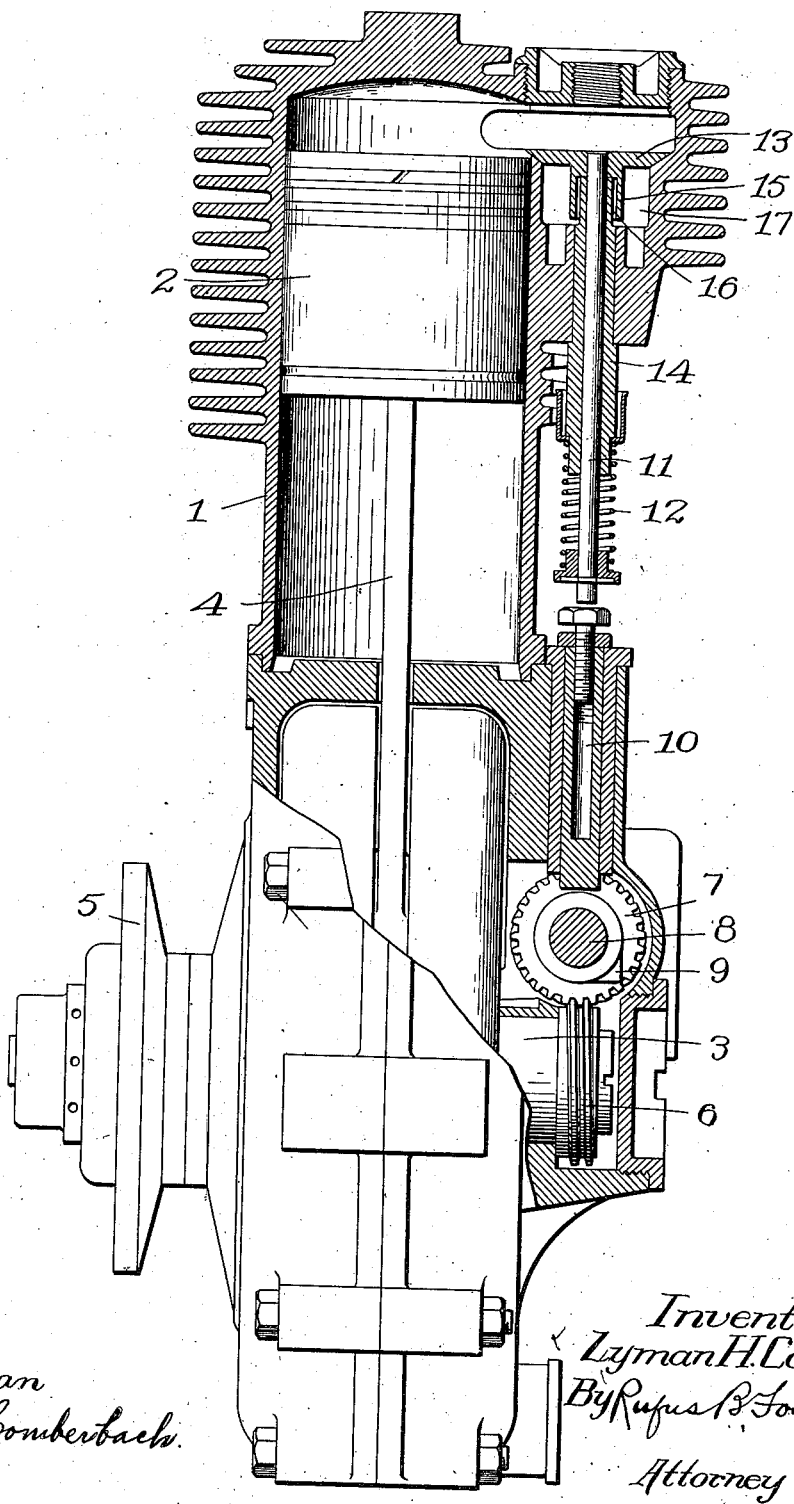

LYMAN H. COBB, OF FITCHBURG, MASSACHUSETTS, ASSIGNOR TO MARY ELIZABETH JOHNSON, TRUSTEE UNDER THE WILL OF IVER JOHNSON, OF FITCHBURG, MASSACHUSETTS.

ENGINE VALVE MECHANISM.

1,136,408.     Specification of Letters Patent.     Patented Apr. 20, 1915.

Original application filed December 11, 1911, Serial No. 665,054. Divided and this application filed September 11, 1913. Serial No. 789,389.

*To all whom it may concern:*

Be it known that I, LYMAN H. COBB, a citizen of the United States, residing at Fitchburg, in the county of Worcester and Commonwealth of Massachusetts, have invented a new and useful Improvement in Engine Valve Mechanism, of which the following, together with the accompanying drawing, is a specification.

This application is a division of my application for patent on internal combustion engine, Serial No. 665,054, filed December 11, 1911.

My invention relates to engine valve mechanism and more particularly to mechanism for protecting the stems of engine valves from the action of heat and corrosive substances.

The practice of my invention is especially advantageous in connection with internal combustion engines. In such engines it is common for the stem of the exhaust valve to pass through the exhaust port so that it lies in the path of the highly heated exhaust gases from the cylinder. The heat and the corrosive action of these exhaust gases as they pass the valve stem must, in time, cause considerable injury to the stem if unprotected.

One object of the invention, therefore, is to provide an improved form of protection for a valve stem which is exposed to the injurious effects of heat or corrosion caused by surrounding substances such as exhaust gases.

While valve mechanism constructed in accordance with my invention seems particularly applicable in connection with internal combustion engines, it is obvious that the construction may be advantageous in connection with any valves, the stems of which are exposed to the injurious effects of heat or corrosion.

Other objects and advantages will appear from the following description taken in connection with the accompanying drawings, in which the figure represents an elevation partly in section of an internal combustion engine of that type commonly used upon motorcycles.

The form of invention shown in the drawing includes a cylinder 1 inclosing a piston 2 which drives a crank shaft 3 by means of a connecting rod 4, the crank shaft 3 carrying a driving pulley 5. A worm gear 6 on the crank shaft 3 drives a second worm gear 7 on the cam shaft 8 so as to rotate the cam 9 carried by the cam shaft. Rotation of the cam 9 causes the tappet 10 to reciprocate vertically so as to lift the valve stem 11, the compression spring 12 serving to return the valve stem and tappet toward the cam as soon as the raised portion of the cam has passed from beneath the tappet. The reciprocation of the valve stem 11 causes the valve 13, secured to its upper end, to open and close at proper intervals to control the exhaust from the cylinder 1.

The valve stem 11 is guided in a bearing 14 driven into an opening in the frame of the engine so as to be supported by friction. The upper end of the bearing 14 is extended as far as possible toward the valve 13 without interfering with the proper seating of the valve so that, when the valve is fully seated, the upper end of the bearing will surround and protect all that portion of the valve stem which is not protected by the valve itself. The valve 13 is provided with a flange 15 surrounding the upper end of the bearing 14 so as to afford additional protection to that portion of the valve stem lying within the exhaust port. One of the main features of this flange 15 is that it is large enough to leave a space 16 between its inner surface and the protecting upper end of the bearing 14. The flange 15 is also sufficiently long to overlap considerably the upper end of the bearing 14 when the valve has been fully opened by the cam 9.

When the highly heated and usually corrosive exhaust gases from the cylinder 1 pass through the exhaust port 17 after the valve 13 has been opened, they come into contact with the outer surface of the flange 15. This flange, as well as the valve 13 and the bearing 14, may be made from some material, such as high carbon steel, which is only slightly affected by the surrounding gases, although it is desirable that the valve stem 11 be constructed of a low carbon steel, or some other material adapted to withstand the shocks imparted to it by the cam 9, such materials being much more subject to injury from the heating and corroding actions of the exhaust gases. The upper end of the space 16 is closed so that the surrounding gases cannot enter it to any appreciable extent so as to come into contact with the valve stem above the upper end of the bearing 14 while the valve is open. The important function of this space, however, is to prevent the flow of heat by conduction from the flange 15 through the upper end of the bearing 14 to the valve stem. It is well known that gas is a poor conductor of heat and the layer of gas within the space 16 acts as an efficient heat insulator surrounding the valve stem. Although the heat may warp or distort the flange 15 slightly, this can have no effect upon the valve stem because of the intervening space 16.

While the upper end of the bearing 14 is shown as lying within the flange 15, it is obvious that their positions might be reversed if desired without interfering with the function of the intervening insulating space 16 and such reversal may be desirable under certain conditions.

While I have shown and described the details of one form of my invention, I do not wish to be limited to such details as changes may be made without departing from the spirit of the invention; but Having described my invention, what I claim as new and desire to secure by Letters Patent is:

1. Engine valve mechanism including a valve provided with a stem, a bearing for the stem, and a flange extending from the valve and surrounding the adjacent end of the bearing, the flange and the end of the bearing surrounded thereby being spaced apart to form an insulating layer, the insulating layer serving to prevent access of heat to the valve stem by conduction.

2. Engine valve mechanism including a valve provided with a stem, a bearing for the stem, and a flange extending from the valve, the flange and the adjacent end of the stem overlapping and being spaced apart to form an insulating layer, the insulating layer serving to prevent access of heat to the valve stem by conduction.

3. Engine valve mechanism including a valve provided with a stem, a bearing for the stem, and a flange extending from the valve, the flange and the adjacent end of the bearing overlapping with one outside the other to form a telescopic joint, there being a space between the overlapping portion of the outer member of the joint and the stem to prevent access of heat to the stem by conduction.

Dated this eighth day of September 1913.

LYMAN H. COBB.

Witnesses:
RUFUS B. FOWLER,
PENELOPE COMBERBACH.